Sept. 14, 1954
T. R. THOREN ET AL
2,688,925
MIXED FLOW MULTIPLE PUMP
Filed Sept. 27, 1950
4 Sheets-Sheet 4
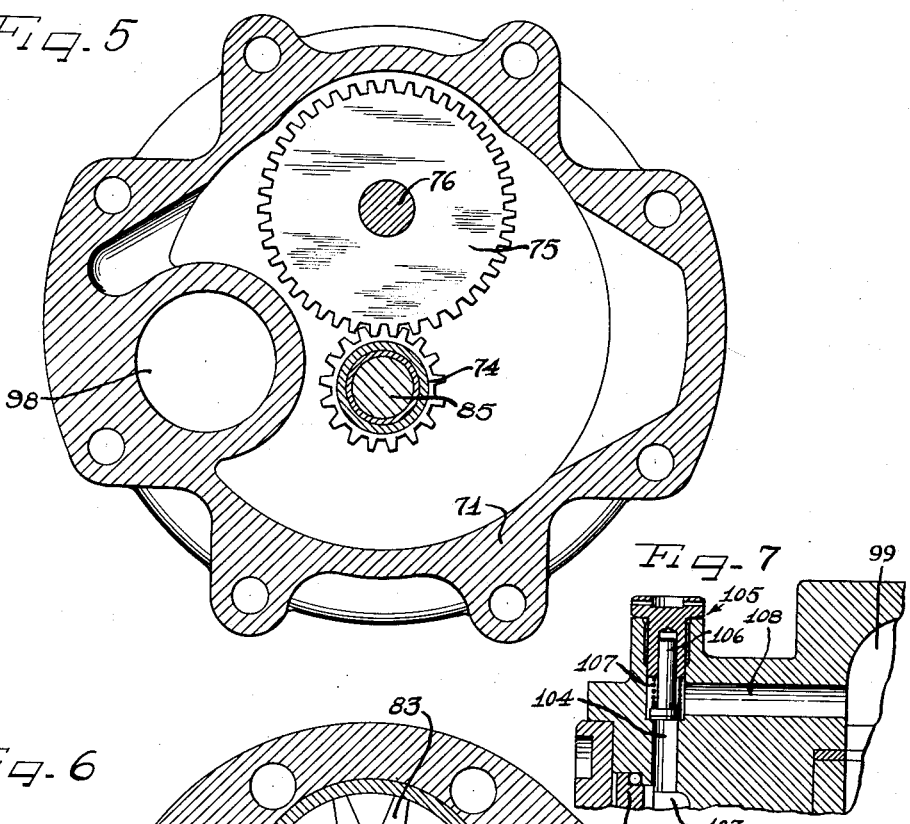
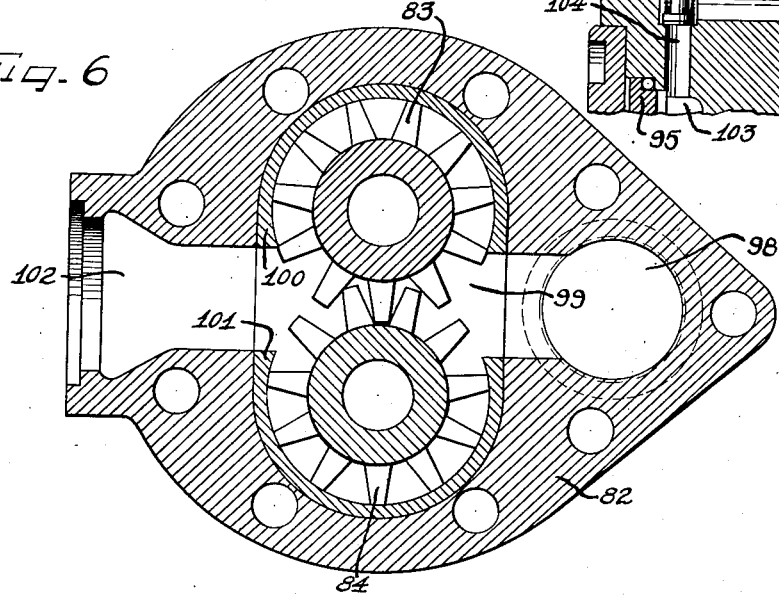
Inventors
Theodore R. Thoren
John F. Murray
by The Firm of Charles W. Hills
Attys Patented Sept. 14, 1954

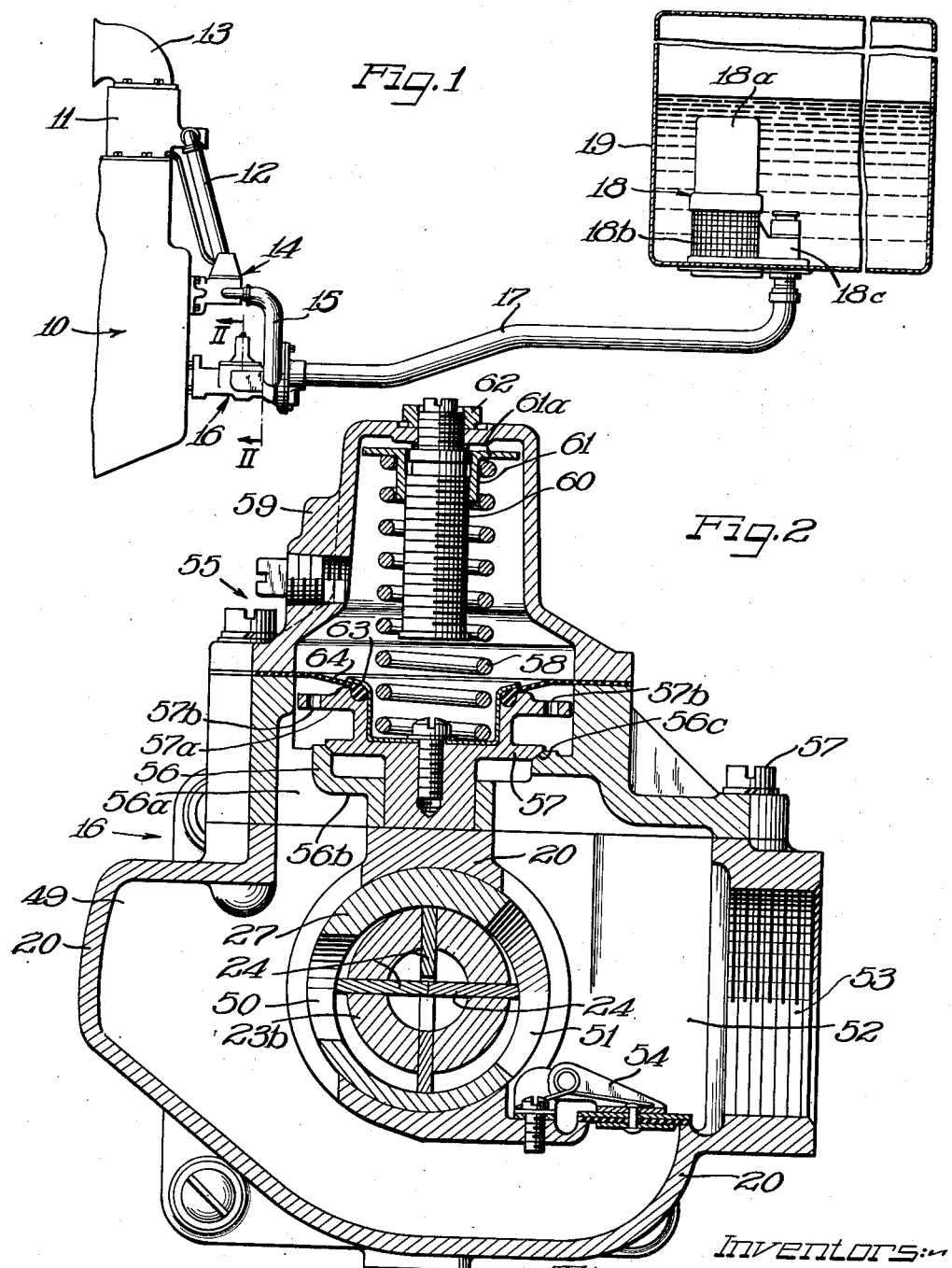

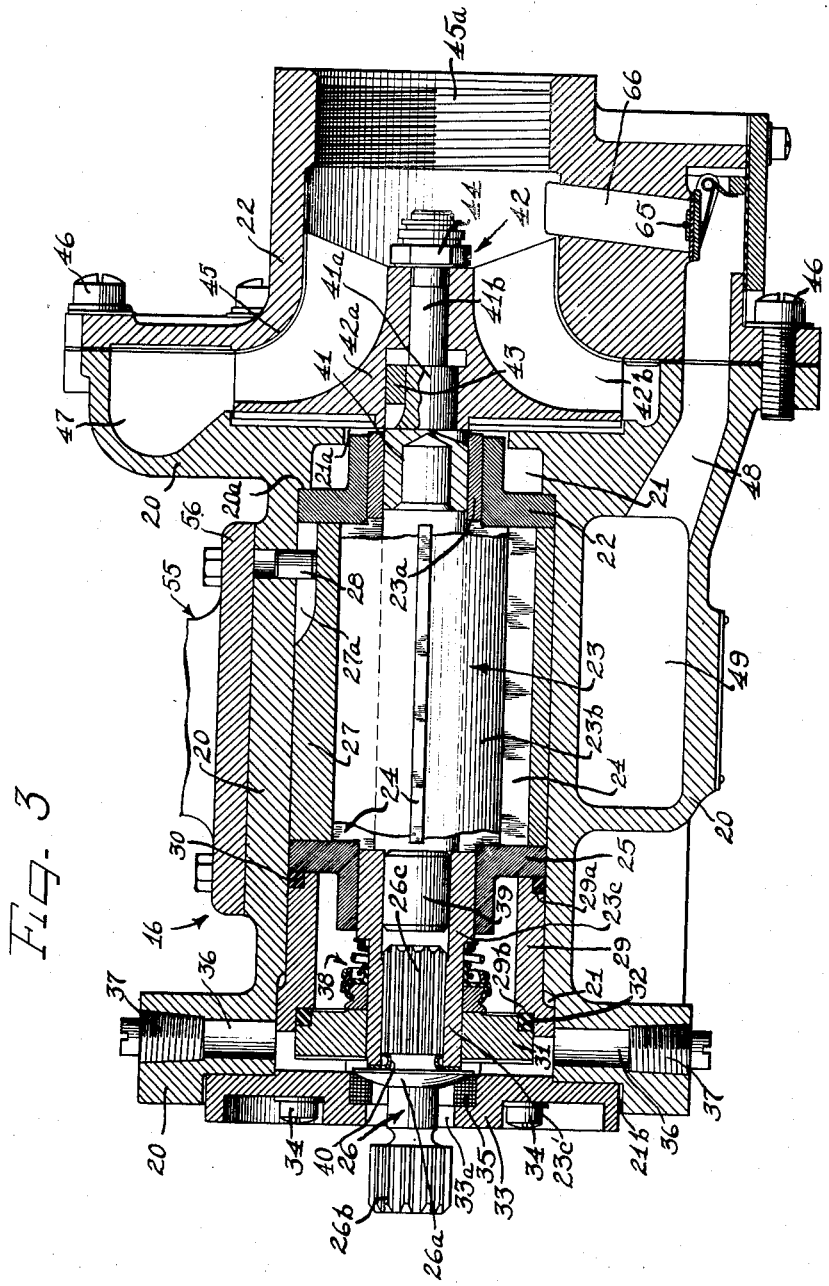

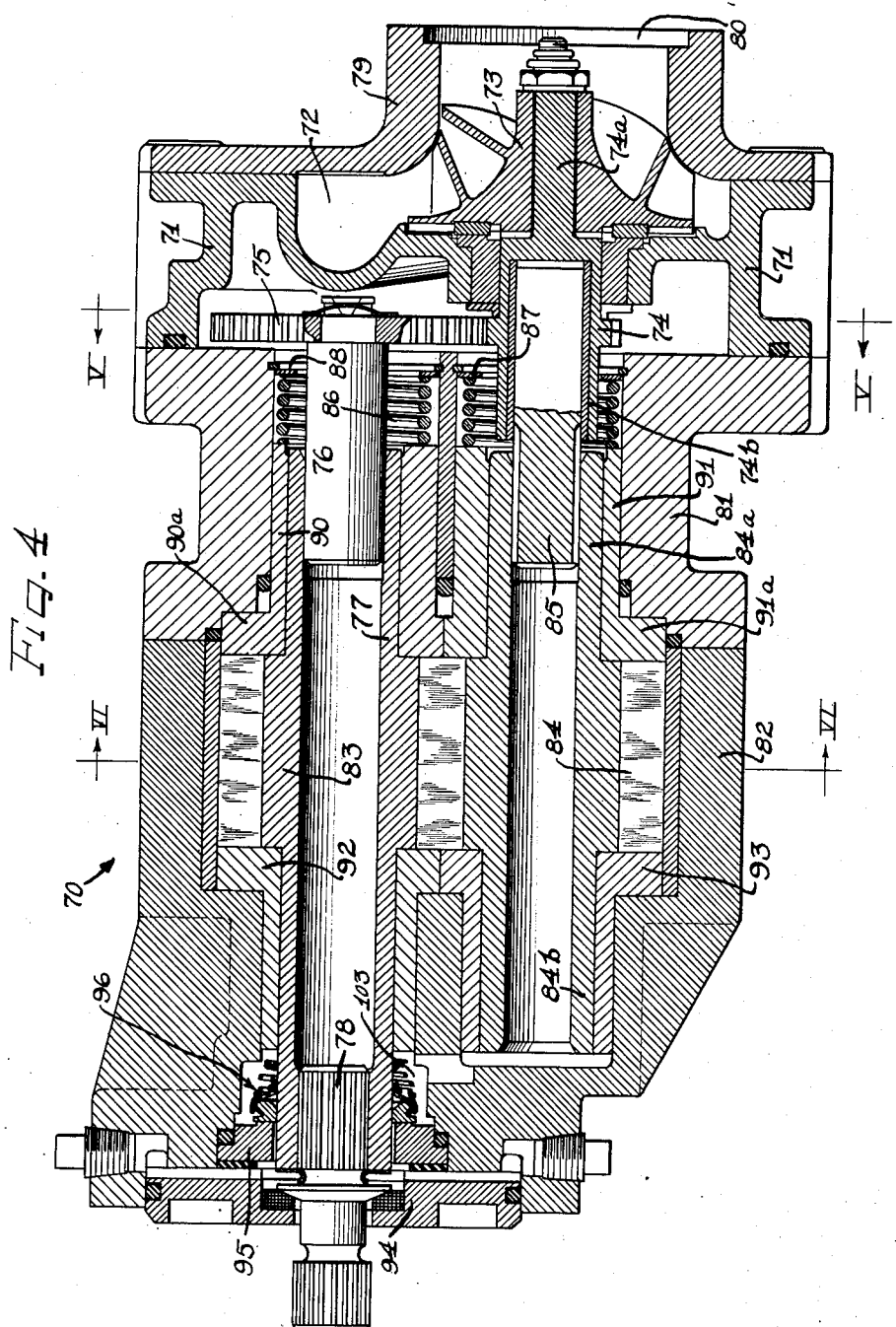

2,688,925

UNITED STATES PATENT OFFICE 2,688,925

MIXED FLOW MULTIPLE PUMP

Theodore R. Thoren, Chagrin Falls, and John F. Murray, Macedonia, Ohio, assignors to Thompson Products, Inc., Cleveland, Ohio, a corporation of Ohio Application September 27, 1950, Serial No. 187,077

3 Claims. (Cl. 103—5)

This invention relates to an aircraft fuel system and relates particularly to a mixed flow multiple pump for incorporation within such a system for pressuring the volatile aircraft fuel toward the aircraft engine. Such a pump finds particular utility during high altitude operation of the aircraft.

Due to the volatile nature of aircraft fuel, abrupt pressure drops within the piping and fluid conduits should be avoided lest vapor be evolved in quantities great enough to cause vapor lock.

One such abrupt pressure drop occurs in the pump between the inlet fitting and the pumping chambers. This loss is commonly known as "inlet loss." Such loss occurs in vane pumps, gear pumps, and, in fact, most positive displacement types wherein the fuel must flow in against rotating pumping elements. Vapor evolved as a result of such pressure loss reduces the volumetric efficiency of the pump. The way to overcome such pressure loss is to supply additional pressure at some suitable point in the circuit. We propose to supply this pressure increment by means of a low inlet loss centrifugal pumping element in series and ahead of the positive displacement pump.

It is a feature of the present invention to provide a mixed flow multiple pump for incorporation with an aircraft fuel system as an "in line" pump—that is, the pump is in the fuel line between the fuel cell and the engine-driven main fuel pump. The pump of this invention may be driven by the aircraft engine, or from an auxiliary power source such as an electric motor. The pump is a two-stage type; the first, a mixed flow centrifugal impeller stage, and the second, a positive displacement stage employing sliding vane mechanism or gear pumping mechanism. The mechanism of the first stage supplies fuel to the second stage under increased or boost pressure. The second stage increases the pressure on the fuel to the engine-driven main fuel pump.

A booster pump having highly efficient vapor separating characteristics may be incorporated in the fuel system at the fuel cell for pressuring fuel to the mixed flow multiple pump. The mixed flow multiple pump may be operated as the main engine-driven fuel pump, or may be installed as previously mentioned, as an auxiliary or booster pump to the main fuel pump. When installed in the fuel system with the main fuel pump and a fuel cell booster pump, the fuel may by-pass the mixed flow multiple pump during inoperation of the pump by means of by-pass valves which are opened under pressure of the fuel being pumped by the fuel cell booster and/or by the engine driven fuel pump. A similar by-pass system is provided in the fuel cell booster pump so that in the event of inoperation of that pump, fuel may by-pass the pump and flow to the mixed flow multiple pump and main fuel pump.

The mixed flow multiple pump has the advantage of low inlet losses, which factor provides for improved pumping performance at the low atmospheric pressures encountered at high altitudes and thereby is enabled to provide the main fuel pump with a continuous flow of pressured fuel.

Accordingly, it is an object of this invention to provide an improved fuel system for aircraft engines.

Another object of this invention is to provide a mixed flow multiple pump for incorporation in an aircraft fuel system, the pump having two stages, the first for avoiding inlet pressure losses and for pressuring fluid to the inlet of the second stage, or positive displacement pumping stage.

It is another object of this invention to provide a fuel pump for aircraft engines which may be driven by the aircraft engine, or by auxiliary power means, and which is provided with a fuel by-pass so as not to disrupt fuel flow during inoperation of the pump.

Other and further features and objects of the invention will be apparent to those skilled in the art from the following detailed description of the annexed sheets of drawings which, by way of preferred example only, illustrate two specific embodiments of the invention.

On the drawings:

Figure 1 is a diagrammatic view of the elements comprising an aircraft fuel system which incorporates an engine-driven mixed flow multiple pump having an impeller stage and a positive displacement vane-type pumping stage;

Figure 2 is an irregularly taken vertical cross-sectional view of the mixed flow multiple pump of Figure 1, taken substantially as indicated by line II—II of Figure 1 so as to show internal structure of the pump at the vane stage and to expose the relief valve structure for the vane stage;

Figure 3 is a vertical cross-sectional view of the pump of Figure 2 taken in the plane of the longitudinal axis of the impeller and the rotary vane;

Figure 4 is a vertical cross-sectional view taken in the plane of the longitudinal axis of a modified mixed flow multiple pump having an impeller inlet stage and a positive displacement gear pumping outlet stage;

Figure 5 is a vertical cross-sectional view of the multiple pump of Figure 4 taken substantially as indicated by the line V—V of Figure 4 and showing the driving gears for the multi-stage pump;

Figure 6 is a vertical cross-sectional view taken substantially as indicated on the line VI—VI of Figure 4 showing the fuel pumping gear chamber and the inlets and outlets thereto; and Figure 7 is a cross-sectional view of the valve for maintaining a positive pressure in the seal chamber for the pump of Figure 4.

As shown on the drawings:

In Figure 1 the reference numeral 10 indicates generally an aircraft engine having a carburetor 11 which properly mixes liquid fuel received from its fuel inlet duct 12 with air received from an air inlet stack 13.

The engine 10 drives a fuel pump 14 which has an inlet fuel duct 15 connected to the outlet of an engine-driven mixed flow multiple pump 16 having an impeller inlet stage and a rotary, sliding vane outlet pumping stage. The inlet to the multiple pump 16 is connected to a fuel duct 17 in communication with a fuel cell booster pump 18.

The booster pump 18 is disposed within a fuel cell 19 and is driven by an electric motor housed within the upper section of its casing 18a. The pump 18 is a highly efficient liquid-vapor separating centrifugal pump which receives fuel from the cell 19 through its lower screened section 18b and thereafter centrifugally separates the heavier liquid portion of the fuel and pressures the liquid portion to its outlet 18c which communicates with the fuel line 17. The booster pump 18 has its inlet and outlet in constant communication to permit fuel to flow directly from its inlet to its outlet under pull of the pump 14 and for the pump 16 during inoperation of the booster pump 18.

The pump 16 has an irregularly shaped body casing 20 having an open ended channel 21 (Figure 3) for accommodating the moving parts of the pump 16 and their associated elements. An internal annular shoulder 20a on the casing 20 receives the radial flange of a thrust bearing 22 near one open end 21a of the channel 21. The bearing 22 journals one reduced end portion 23a of a hollow shaft 23. The other end portion 23c of the hollow shaft 23 is also diametrically reduced and journaled by a bearing 25 of similar configuration to the bearing 22. The end portion 23c is internally splined at 23c' to receive a stub-driving shaft 26 to be described in more detail hereinafter.

An eccentric sleeve or pumping liner 27 is disposed between the thrust bearings 22 and 25 to embrace an enlarged diameter or vane pumping rotor section 23b of the shaft 23. The sleeve 27 embraces the pumping section 23b in close running relation at the top surface of the shaft and in spaced running relation at the bottom longitudinal surface of the shaft. The pumping section 23b of the shaft 23 has a plurality of radial slots for accommodating sliding vanes 24. During rotation of the shaft 23, the vanes 24 slide radially inwardly and outwardly in the section 23b as their outer edges contact the inner periphery of the eccentric sleeve 27. A dowel pin 28 projecting from the casing 20 into a keyway slot 27a in the eccentric sleeve 27 prevents radial displacement of the sleeve.

A sleeve or bearing spacer 29 thrusts against the bearing 25 on the side opposite to the pumping section 23b of the shaft 23 and has a shoulder 29a for accommodating a bearing gasket 30. A counterbore 29b on the end of the sleeve 29 opposite the bushing 25 receives a fuel seal collar 31 and a seal ring 32. The collar 31 embraces the shaft 23 about its splined end section 23c' but will not rotate with the shaft 23. The collar seals the inside of the sleeve or bearing spacer 29 from the leakage of fuel during the pumping operation to be later described.

The casing 20 has a counterbore 21b communicating with the channel 21 at the end opposite to the opening 21a. The counterbore 21b nests a closure plate 33 secured to the casing 20 as by the cap screws 34 with its inner surface spaced from the internally splined end 23c' of the shaft 23.

The closure plate 33 has a central aperture 33a so as to embrace the stub shaft 26 in spaced relation. The plate 33 is counterbored on its inner surface about its aperture 33a to accommodate an annular graphite seal 35 which rides on an annular flange 26a of the shaft 26.

The shaft 26 has a projecting externally splined end portion 26b for driving connection with the aircraft engine or other driving mechanism. The internal end of the shaft 26c is also externally splined for driving connection to the internally splined portion 23c' of the shaft 23.

The casing 20 has a plurality of radial channels 36 axially spaced a relatively short distance from the end closure plate 33 which are capped by the plugs 37. One of these plugs such as the lowermost one can be replaced with a drain tube to the aircraft slipstream for removal of any fuel leaking from the pump. The space drained by such a tube (not shown) is, of course, sealed from the pump by a seal unit 38 for the shaft 23c and collar 31 and by the seal 35 so that fuel from the shaft 26 cannot escape during the pumping operation.

A plug 39 is disposed in the hollow shaft 23 between the splined end 26c' of the shaft 26 and the pumping rotor section 23b to seal communication therebetween. Another seal member 40 is also disposed about the end 23c of the shaft 23 so as to contact the inner surface of the flanged portion 26a of the shaft 26 for retaining lubricant in the spline chamber.

As the shaft 26 is rotated from its source of power, the rotary movement is imparted to the shaft 23 along its entire length to the end portion 23a which is journaled by the bearing 22 and which projects into the end opening 21a in the casing 20.

A stub shaft 41 is press fitted within the end section 23a of the shaft 23 for rotation therewith. A reduced diameter portion 41a projects through the opening 21a and is secured by a key 43 to the hub 42a of a mixed flow (radial and axial flow) impeller 42. A further projecting portion 41b of the stub shaft 41 of lesser diameter has a threaded end portion for receiving a locking nut 44 which secures the impeller 42 from axial movement on the shaft 41. The impeller has mixed-flow type vanes 42b which at their outer edges operate in close running relation to a substantially annularly shaped inlet closure member 45 defining a fuel inlet 45a communicating with the fuel line 17. The closure plate 45 is secured to the casing 20 as by cap screws 46 and cooperates with the casing 20 to define a volute chamber 47 surrounding the radially extending portions of the vanes 42b.

During operation of the pump 16, fuel enters from the fuel line 17 through the inlet 45 and is centrifugally discharged by rotation of the impeller 42 into the volute chamber 47. The fuel is then pressured into a communicating channel 48 which communicates with the vane pumping inlet chamber 49. The chamber 49 is in communication with an inlet 50 (Figure 2) of the eccentric housing or vane pumping liner 27 which houses the pumping rotor section 23b of the shaft 23. The vanes 24 then pressure the fuel in a positive displacement process through an outlet 51 in the housing 27 into a vane pumping outlet chamber 52 in the casing 20. The casing 20 defines an outlet port 53 which is connected to the fuel communicating line 15 to the fuel pump 14.

A spring-loaded by-pass valve 54 closes the vane pumping inlet chamber 49 from the vane pumping outlet chamber 52 during normal operation. If the inlet pressure to the vane pump (which is the outlet pressure from the impeller pump) reaches a predetermined maximum, the by-pass valve 54 will be opened and fuel will pass from the chamber 49 to the chamber 52, by-passing the vane pump.

A relief valve, indicated generally by the reference numeral 55 (Figure 2), is provided in the event the outlet pressure of the pump 16 exceeds a predetermined maximum. The relief valve 55 is disposed above the casing 20 in communication with the vane pumping inlet 49 and the outlet chamber 52. A base 56 for the valve is secured to the top of the casing 20 as by bolts 57. The base 56 has a central bore 56a and a central section 56b disposed within the bore to provide a valve seat 56c which seats an axially movable valve plug 57 having a web 57a slidable in the base 56 above the valve seat 56c. The plug 57 remains seated due to the pressure of a coil spring 58 acting between a well in the plug 57 and a well in the cap member 59 for the relief valve 55. The force of the spring 58 may be adjusted by a centrally disposed bolt-like member 60 which threads into a sleeve 61 having an annular flange 61a for receiving the top of the spring 58. A jam nut or plug 62 is threaded onto the screw 60 for locking against further adjustment of the spring 58.

The spring 58 is bottomed in the well of the plug 57 on an annular clip 63 which retains the central portion of an annular diaphragm 64. The peripheral margin of the diaphragm 64 is retained between the base 56 and the cap 59.

If fuel in the outlet chamber 52 of the pump 16 exceeds a predetermined maximum, pressure exerted on the plug 57 will cause the plug to shift axially upward against the pressure of the spring 58 from the seat section 56b. The fuel will then be permitted to flow into the vane pumping inlet chamber 49 to relieve pressure at the outlet 53.

A plurality of circumferentially spaced bleeding apertures 57b are provided in the web 57a of the plug 57 to hydraulically balance the space between the diaphragm 64 and web with the space beneath the web.

From the foregoing description it will be seen that fuel enters the pump 16 through the inlet 45 and is centrifugally discharged by the impeller 42 into the volute 47 which empties into the communicating channel 48 to the vane pumping inlet chamber 49. From the vane pumping inlet chamber 49 the fuel is pumped under increased pressure by the vane pumping rotor 23b of the shaft 23 into its outlet chamber 52 which communicates by means of the line 15 to the engine-driven fuel pump 14.

It should also be understood that if the fuel pressure in the vane inlet chamber 49 exceeds a predetermined maximum, the by-pass valve 54 will open and the fuel will by-pass the vane pump 23b.

However, there is also provided a by-pass arrangement so that both the impeller and the vane pumping stage of the pump 16 may be by-passed during inoperation of the pump 16. This arrangement comprises a spring-loaded by-pass valve 65 (Figure 3) disposed in a by-pass channel 66 which communicates with the inlet 45 of the pump 16. The by-pass valve 65 closes communication between the inlet by-pass channel 66 and the communicating channel 48. During inoperation of the pump 16 and/or the booster pump 18, the main fuel pump 14 will create vacuum pressure in the fuel lines, sufficient to draw fuel from the fuel cell 19 through the booster pump 18. The fuel pressure thus created by the engine-driven main fuel pump will be sufficient to open the by-pass valve 65 and allow the fuel to pass from the inlet by-pass channel 66 into the communicating channel 48 and on to the vane pumping inlet chamber 49. Since the vane pump is likewise not in operation the pressure on the fuel in the chamber 49 will not be opposed by outlet pressure 52 from the vane pump 23b (Figure 2) and will, therefore, open the by-pass valve 54 previously described. The fuel will then pass from the vane pumping outlet chamber 52 through the outlet 53 to the main fuel pump 14 and engine 10.

A modified structure indicated generally by the reference numeral 70 (Figure 4) may be utilized in place of the pump 16. The pump 70 comprises an impeller inlet stage and a positive displacement gear pumping outlet stage.

The pump 70 has an impeller casing 71 which defines a volute 72 surrounding a mixed flow impeller 73 which is secured to a projecting end portion 74a of a hollow driven gear 74. The gear 74 is driven from a gear 75, connected by a stub shaft 76 to a hollow shaft 77, internally splined to receive a driving shaft 78 constructed similarly to the stub driving shaft 26 of the vane pump 16. The stub driving shaft 78 is, of course, connected to the engine or other power source. A closure plate 79 closes the impeller casing 71 and defines an inlet 80 to the impeller 73.

The other end of the impeller casing 71 is secured in sealed relation to a casing section 81 which houses the stub shaft 76 of the gear 75 and a projecting hollow end portion 74b of the gear 74. The casing section 81 is secured at its other end to a pumping gear casing 82 which houses an upper pumping gear 83 integrally formed to the hollow driving shaft 77 and a lower pumping gear 84 which is hollowed and has integrally formed axially projecting end sections 84a and 84b. The axially projecting end section 84a receives a stub shaft 85 in press fitted relation. The stub shaft 85 is also brazed to the end section 84a and provides a journal for rotation of the bushing 74b press fitted into the gear 74. As the driving shaft 78 is rotated the hollow shaft 77, the integrally formed pumping gear 83, the stub shaft 76 and the driving gear 75 also rotate. The driving gear 75 drives the relatively smaller gear 74 on its associated stub shaft 85 and the hollow pumping gear 84. The impeller 73 rotates with the gear 74.

A pair of coil springs 86 are secured within the casing 81 to bottom against rings 87 and 88, respectively, and thrust against bearings 90 and 91 which surround the shafts 77 and 84a, respectively. Peripheral flange portions 90a and 91a on the thrust bearings 90 and 91, respectively, thrust against the pumping gears 83 and 84. The other side of the gears 83 and 84, respectively, thrust against the bearings 92 and 93, which are secured within the casing structure 82.

The end of the casing 82 nearest the source of power is closed by a closure plate 94 similar to the closure plate 33 of the pump 16 and the driving shaft 78 and the hollow shaft 77 are embraced by a collar 95 and a seal unit 96 similar to the collar 31 and seal unit 38 of the pump 16.

During operation of the pump 70 the impeller 73 centrifugally discharges fuel taken from the inlet 80 under pressure into the volute 72. The fuel is pressured from the volute 72 into an axial communicating passageway 98 (Figures 5 and 6) to the gear pumping stage of the pump 70. The fuel then empties into the gear pumping chamber 99 defined between the pumping gears 83 and 84. Inserts 100 and 101 within the casing member 82 surround the pumping gears 83 and 84, respectively, to keep the fuel from passing about the outer periphery of the gears. The fuel is pumped in the conventional manner by the pumping gears 83 and 84 into the outlet chamber 102 and into the line 15 to the engine-driven fuel pump 14.

As shown in Figure 7, the seal chamber 103 is vented through passage 104 to a spring loaded valve assembly 105 having a valve 106 loaded by a spring 107 which, when closed, separates passage 104 from a passage 108 to the inlet chamber 98. If excessive leak down pressure exists in seal chamber 103, the valve 106 will open against the spring load to discharge the leaked in fluid to the inlet 98. However, the spring loaded valve will always maintain a positive pressure above inlet pressure in the seal chamber, and this pressure can be controlled so as to not rise above a desired maximum by selective setting of the compression of the spring 107.

It will, of course, be understood that the mixed flow multiple pump of the type illustrated by pump 16 and by the pump 70 could be utilized in installations other than in an aircraft fuel system.

It will also be understood that modifications and variations may be effected without departing from the scope of the novel concepts of the present invention.

We claim as our invention:

1. A multiple pump unit comprising, a casing having an open-ended channel therethrough defining a fluid inlet at one end thereof, an annular pumping chamber surrounding said inlet, a fluid passageway connecting said annular pumping chamber and a medial portion of said open-ended channel, and an outlet communicating with said medial portion, means on said casing defining a gear pumping chamber adjacent said outlet, a drive shaft journaled in said casing at the other end of said open-ended channel, an impeller shaft journaled adjacent the inlet end of said casing, an impeller secured to said impeller shaft for co-rotation therewith, mixed-flow pumping vanes on said impeller projecting into said inlet and having their radial ends disposed adjacent said chamber, a first pumping gear journaled in said casing and engaged by said drive shaft, a second pumping gear journaled in said casing and having a hollow portion receiving one end of said impeller shaft, a first driving gear connected to said first pumping gear, and a second driving gear connected to said impeller shaft, said gears being in meshed relation, whereby fluid is pressured during rotation of said drive shaft by said impeller from said inlet through said annular pumping chamber to said gear pumping chamber wherein it is subject to increased pressure and discharged to the casing outlet.

2. A pump comprising a casing having a series interconnected volute pumping chamber and intersecting bores forming a gear pumping chamber with a pump inlet to said volute pumping chamber and a pump outlet from said gear pumping chamber, a driver gear rotatable in one of said intersecting bores having a driving connection projecting outside of said casing and a first coupling gear inside of said casing, a driven gear rotatable in the other of said intersecting bores and having a shaft extension fixed thereto for rotation therewith, and a centrifugal impeller in said volute pumping chamber journaled on said shaft extension and having a second coupling gear meshing with said first coupling gear, said first and second coupling gears being sized with respect to one another to drive said centrifugal impeller at higher rotational speeds than said driver and driven gears.

3. A pump comprising a casing having a series interconnected volute pumping chamber and intersecting bores forming a gear pumping chamber with a pump inlet to said volute pumping chamber and a pump outlet from said gear pumping chamber, a driver gear rotatable in one of said intersecting bores having a driving connection projecting outside of said casing and a first coupling gear inside of said casing, a driven gear rotatable in the other of said intersecting bores and having a shaft extension fixed thereto for rotation therewith, and a centrifugal impeller in said volute pumping chamber journaled on said shaft extension and having a second coupling gear meshing with said first coupling gear, said first and second coupling gears being sized with respect to one another to drive said centrifugal impeller at higher rotational speeds than said driver and driven gears, said coupling gears being constructed and arranged to rotate said driven gear and said centrifugal impeller in a common direction to minimize the relative rotational speed at the journaled surfaces between said shaft extension and said centrifugal impeller.

References Cited in the file of this patent

UNITED STATES PATENTS

| Number | Name | Date |
|---|---|---|
| 1,927,799 | Mann | Sept. 19, 1933 |
| 2,055,587 | Pigott | Sept. 29, 1936 |
| 2,196,500 | Johnson | Apr. 9, 1940 |
| 2,409,931 | Curtis | Oct. 22, 1946 |
| 2,487,732 | Schanzlin | Nov. 8, 1949 |
| 2,500,227 | Adams | Mar. 14, 1950 |
| 2,500,228 | Adams | Mar. 14, 1950 |
| 2,581,886 | Rockwell | Jan. 8, 1952 |